3,337,587
2-HYDROCARBON-5,6-EPOXY-1,3-DIOXEPANES
Samuel W. Tinsley, Jr., and Donald L. MacPeek, South Charleston, W. Va., assignors to Union Carbide Corporation, a corporation of New York
No Drawing. Filed Mar. 21, 1960, Ser. No. 16,132
19 Claims. (Cl. 260—338)

This invention relates, in general, to a new class of organic compounds and more particularly to novel epoxy acetals. In one aspect, this invention relates to 3,5,8-trioxabicyclo[5.1.0]octanes and methods for their preparation.

The novel compounds of this invention, hereinafter referred to as epoxy acetals, can be conveniently represented by the following general formula:

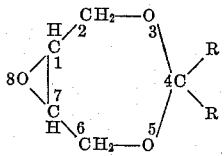

wherein R is a member selected from the group consisting of hydrogen and aliphatic, alicyclic and aromatic groups and wherein both R's can be part of the same homocarbocyclic ring system. Preferred compounds represented by the aforesaid formula are those containing from 1 to 3 epoxy groups, and wherein R contains not more than 22 carbon atoms, more preferably not more than 18 carbon atoms, and still more preferably not more than 7 carbon atoms, either as a straight chain, branched chain or part of a ring system. Also preferred are those compounds represented by the aforesaid formula wherein at least one R contains the epoxy group,

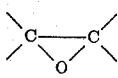

Particuly preferred epoxy acetals are those compounds wherein R is alkyl, alkenyl, aryl, cycloalkyl, alkylcycloalkyl, cycloalkenyl, cycloalkenylalkyl, alkylcycloalkenyl, bicycloalkyl, bicycloalkenyl, bicycloalkylalkyl, bicycloalkenylalkyl, epoxyalkyl, epoxycycloalkyl, alkylepoxycycloalkyl, or epoxybicycloalkyl, and wherein at least one epoxy group is present in the R radical.

It should be noted that the novel acetal compounds of this invention can be either monofunctional or polyfunctional depending upon the number of reactive groups present in the molecule. For example, the novel epoxy acetals encompassed by the first embodiment of the present invention, as hereinafter described, contain but one epoxy group in the molecule and no other reactive group. The second embodiment includes compounds of a polyfunctional nature in that the R group contains one or more epoxy groups and additionally can also contain olefinic unsaturation either in place of, or in conjunction with the epoxy group.

By the term "epoxyalkyl" as employed throughout the specification and claims is meant an alkyl group to one pair of vicinal carbon atoms of which oxirane oxygen is attached.

Due to the presence of the epoxy group,

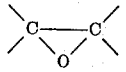

the novel compounds of this invention are useful in the preparation of epoxy resins. Particularly noteworthy, are the di- and tri-epoxy acetals which form excellent compositions when hardened with polyamines, polyacids, anhydrides, and the like. Additionally, the epoxy acetals which contain one or more double bonds are useful as monomers for copolymerization with vinyl compounds to give coatings and films which may be cross-linked through the epoxy group itself. The novel epoxy acetals of this invention are also valuable as stabilizers for chlorine-containing resins. For example, the novel compounds of this invention containing two epoxy groups have been found useful as plasticizers with vinyl halide resins. By incorporating into the resin from about 5 to about 50 percent by weight of these novel epoxides, a plasticized product is obtained which possesses useful resilient and flexible characteristics. The vinyl halide resins which can be satisfactorily plasticized by the compounds of this invention can be any vinyl halide polymer such as polyvinyl chloride, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers, and the like. The compounds of this invention may be used alone or in conjunction with conventional plasticizers.

A particularly interesting novel class of compounds included within the scope of the present invention embraces epoxy acetal compounds which contain a reactive double bond in the molecule as well as the epoxy group. These compounds are especially useful and differ from compounds lacking unsaturation in that they can be converted to polymers through either the oxirane ring or the polymerizable double bond and thereafter cross-linked through whichever of these two was not used in the initial polymerization. Many of the resulting polymeric materials are useful as lubricants and as hydraulic fluids where high temperatures are encountered. Thus, the epoxy acetals of this invention which contain a polymerizable bond are particularly useful since they can be incorporated into polymers through the polymerizable linkage and the epoxy group subsequently used for cross-linking the resin.

It is accordingly an object of the present invention to provide new organic compounds which are suitable for use in the plastic and resin field. Another object is to provide new compositions of matter comprising the epoxy acetals. A further object of the present invention is to provide new compositions of matter comprising the 3,5,8-trioxabicyclo-[5.1.0]octanes. Another object is to provide novel acetals containing more than one epoxy group. A still further object of the present invention is to provide novel compounds having bifunctional properties in that they contain both an epoxy group and an active double bond within the same molecule. Another object of the present invention is to provide a process for the preparation of the novel compositions of matter of this invention. These and other objects will readily become apparent to those skilled in the art in the light of the teachings herein set forth.

In its broad aspect, this invention is directed to novel epoxy acetals of the aforementioned formula which contain 1 to 3 epoxy groups and which can also contain from 1 to 3 olefinic groups in the molecule.

In one embodiment of the present invention the novel epoxy acetals are represented by the aforementioned formula wherein only one epoxy group is present in the molecule with no other functional groups. Preferred compounds within this embodiment include those wherein both R's of the above general formula are free from olefinic unsaturation and epoxy groups. Particularly preferred compounds within this embodiment are those represented by the class formula:

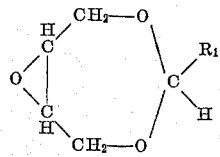

wherein $R_1$ represents hydrogen, alkyl, aryl, cycloalkyl, alkylcycloalkyl or bicycloalkyl groups containing not more than 18 carbon atoms and more preferably not more than 7 carbon atoms.

The following compounds illustrate the novel epoxy acetals of this embodiment of the present invention:

3,5,8-trioxabicyclo[5.1.0]octane,
4-methyl-3,5,8-trioxabicyclo[5.1.0]octane,
4-ethyl-3,5,8,-trioxabicyclo[5.1.0]octane,
4-propyl-3,5,8-trioxabicyclo[5.1.0]octane,
4-butyl-3,5,8-trioxabicyclo[5.1.0]octane,
4-pentyl-3,5,8-trioxabicyclo[5.1.0]octane,
4-heptadecyl-3,5,8-trioxabicyclo[5.1.0]octane,
4-phenyl-3,5,8-trioxabicyclo[5.1.0]octane,
4-naphthyl-3,5,8-trioxabicyclo[5.1.0]octane,
spiro-[cyclohexane-1,4'-(3',5',8'-trioxabicyclo[5.1.0]octane)],
4-(2-bicyclo[2.2.1]heptyl)-3,5,8-trioxabicyclo[5.1.0]octane,
4-(6-methylcyclohexyl)-3,5,8-trioxabicyclo[5.1.0]octane, and the like.

In a second embodiment of the present invention the novel epoxy acetals are represented by the aforesaid general formula wherein one epoxy group is present in the molecule and at least one additional functional groups is present which is a member selected from the class consisting of epoxy and olefinic groups. These difunctional compounds include those wherein at least one R of the general formula contains one or more epoxy or olefinic groups. Preferred compounds are those represented by the class formula:

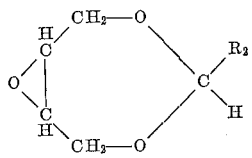

wherein $R_2$ is a member selected from the group consisting of alkenyl, cycloalkenyl, alkylcycloalkenyl, bicycloalkenyl, bicycloalkenylalkyl, epoxyalkyl, epoxycycloalkyl, alkylepoxycycloalkyl, and epoxybicycloalkyl groups containing not more than 18 carbon atoms and more preferably not more than 7 carbon atoms.

The following compounds illustrate the novel epoxy acetals of this second embodiment of the present invention:

4-vinyl-3,5,8-trioxabicyclo[5.1.0]octane,
4-(1,2-epoxyethyl)-3,5,8-trioxabicyclo[5.1.0]octane,
4-(2-propenyl)-3,5,8-trioxabicyclo[5.1.0]octane,
4-(2,3-epoxypropyl)-3,5,8-trioxabicyclo[5.1.0]octane,
4-(7'-tricyclo[3.2.1.0$^{2,4}$]-3'-oxaoctyl)-3,5,8-trioxabicyclo[5.1.0]octane, and the like.

In accordance with the process of this invention, the novel epoxy acetal compounds of the aforementioned embodiments can be produced in high yields by the epoxidation of the olefinic linkage contained in the unsaturated acetal starting material. In the epoxy acetals prepared from compounds containing only one double bond, the epoxidation is effected quite easily. In the acetals prepared from unsaturated compounds having more than one site of unsaturation, it has been observed that epoxidation can occur selectively. Thus, by appropriate combinations of different olefinic groups an essentially complete selectivity can be achieved in the preparation of many epoxy acetals. Compounds which contain double bonds of approximately the same reactivity toward epoxidation can usually not be selectively epoxidized unless the epoxidizing agent is reacted with a large excess of diolefin.

The starting materials for the production of the novel compounds of the present invention, as hereinabove indicated, are the corresponding unsaturated acetals. These compounds can be conveniently represented by the following general formula:

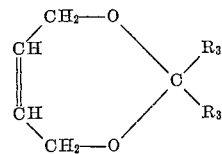

wherein $R_3$ is a member selected from the group consisting of hydrogen and aliphatic, alicyclic and aromatic groups containing not more than 22 carbon atoms, more preferably not more than 18, and still more preferably not more than 7 carbon atoms, and wherein both $R_3$'s can be part of the same homocyclic ring system. These compounds contain from 1 to 3 olefinic groups. Particularly preferred starting compounds are those wherein $R_3$ is alkyl, alkenyl, aryl, cycloalkyl, alkylcycloalkyl, cycloalkenyl, alkylcycloalkenyl, cycloalkenylalkyl, bicycloalkyl, bicycloalkenyl, bicycloalkenylalkyl, and the like. For the novel compounds of the first embodiment of the instant invention $R_3$ will have the same value as $R_1$. For the novel compounds of the second embodiment of the instant invention wherein there are two or more functional groups within the same molecule at least one $R_3$ must contain one or more reactive olefinic linkages and contain at least 2 carbon atoms.

These starting materials are prepared, as indicated in the examples, by the condensation of 2-butene-1,4-diol with the appropriate aldehyde or ketone to form the unsaturated acetal. Examples of the saturated and unsaturated carbonyl-containing compounds which can be condensed with the 2-butene-1,4-diol to prepare respectively the mono- and di-functional starting materials are the following:

| Saturated Carbonyl Compound | Corresponding Monofunctional Starting Material |
|---|---|
| Formaldehyde | 1,3-dioxep-5-ene. |
| Acetaldehyde | 2-methyl-1,3-dioxep-5-ene. |
| Propionaldehyde | 2-ethyl-1,3-dioxep-5-ene. |
| Butyraldehyde | 2-propyl-1,3-dioxep-5-ene. |
| Valeraldehyde | 2-butyl-1,3-dioxep-5-ene. |
| Caproaldehyde | 2-pentyl-1,3-dioxep-5-ene. |
| Stearaldehyde | 2-heptadecyl-1,3-dioxep-5-ene. |
| Benzaldehyde | 2-phenyl-1,3-dioxep-5-ene. |
| 1-napthaldehyde | 2-naphthyl-1,3-dioxep-5-ene. |
| Cyclohexanone | 7,12-dioxaspiro(5,6)-9-dodecene. |
| Bicyclo[2.2.1]heptanecarboxaldehyde. | 2-bicyclo[2.2.1]heptyl-1,3-dioxep-5-ene. |

Upon epoxidation the aforementioned monofunctional starting materials give the following respective novel epoxy acetals:

3,5,8-trioxabicyclo[5.1.0]octane
4-methyl-3,5,8-trioxabicyclo[5.1.0]octane
4-ethyl-3,5,8-trioxabicyclo[5.1.0]octane
4-propyl-3,5,8-trioxabicyclo[5.1.0]octane
4-butyl-3,5,8-trioxabicyclo[5.1.0]octane
4-pentyl-3,5,8-trioxabicyclo[5.1.0]octane
4-heptadecyl-3,5,8-trioxabicyclo[5.1.0]octane
4-phenyl-3,5,8-trioxabicyclo[5.1.0]octane
4-naphthyl-3,5,8-trioxabicyclo[5.1.0]octane
Spiro-[cyclohexane-1,4'-(3',5',8'-trioxabicyclo[5.1.0]octane)]
4-(2-bicyclo[2.2.1]heptyl)-3,5,8-trioxabicyclo[5.1.0]octane, and Unsaturated and other carbonyl compounds:

Acrolein
Crotonaldehyde
3-butenaldehyde
4-pentenaldehyde
Glyoxal
Bicyclo[2.2.1]-5-heptene-2-carboxaldehyde
6-methyl-3-cyclohexenecarboxaldehyde Corresponding difunctional starting materials:
2-vinyl-1,3-dioxep-5-ene
2-(1-propenyl)-1,3-dioxep-5-ene
2-(2-propenyl)-1,3-dioxep-5-ene
2-(3-butenyl)-1,3-dioxep-5-ene
2,2'-di-(1,3-dioxep-5-ene)
2-(6'-bicyclo[2.2.1]-2'-heptenyl)-1,3-dioxep-5-ene
2-(6-methyl-3-cyclohexenyl)-1,3-dioxep-5-ene Upon epoxidation the aforementioned difunctional starting materials give the following respective novel epoxy acetals:

4-vinyl-3,5,8-trioxabicyclo[5.1.0]octane, or
4-(1,2-epoxyethyl)-3,5,8-trioxabicyclo[5.1.0]octane
4-(1-propenyl)-3,5,8-trioxabicyclo[5.1.0]octane, or
4-(1,2-epoxypropyl)-3,5,8-trioxabicyclo[5.1.0]octane
4-(2-propenyl)-3,5,8-trioxabicyclo[5.1.0]octane, or
4-(2,3-epoxypropyl)-3,5,8-trioxabicyclo[5.1.0]octane
4-(3-butenyl)-3,5,8-trioxabicyclo[5.1.0]octane, or
4-(3,4-epoxybutyl)-3,5,8-trioxabicyclo[5.1.0]octane
4-[4'-(3',5',8'-trioxabicyclo[5.1.0]octyl)]-3,5,8-trioxabicyclo[5.1.0]octane
2-(7'-tricyclo[3.2.1.0$^{2,4}$]-3'-oxaoctyl)-1,3-dioxep-5-ene, or
4-(7'-tricyclo[3.2.1.0$^{2,4}$]-3'-oxaoctyl)-3,5,8-trioxabicyclo[5.1.0]octane
4-[4'-(3'-methyl-7'-oxabicyclo[4.1.0]heptyl)]-3,5,8-trioxabicyclo[5.1.0]octane The epoxy acetals hereinabove described are only given for purposes of illustration of the novel compounds of this invention and are not intended to be limited solely to those disclosed.

Although the preferred compounds of this invention contain no elements other than carbon, hydrogen and oxygen, the novel compounds can include other substituents such as chloro, nitro, and like groups.

In a preferred embodiment of the process of the present invention, the epoxidation of the unsaturated starting materials is carried out at tempertaures in the range of from −25° C. to 150° C. At the lower temperatures, the rate of epoxidation is slow, while at the higher temperatures, the rate of epoxidation is faster necessitating precautions to prevent further reaction of the epoxide groups. In order to avoid undesired side reactions and to provide a suitable reaction rate, temperatures in the range of from 10° C. to 90° C. are preferable. In the practice of the invention, the unsaturated starting material is conveniently charged to a reaction vessel and the appropriate quantity of peracetic acid is added. The mole ratio is not necessarily critical and can be varied over a wide range depending on whether the mono-, di-, or higher epoxy compound is desired. The reaction is allowed to proceed for a time sufficient to consume approximately the theoretical quantity of peracetic acid needed to effect epoxidation. The amount of peracetic acid consumed can be determined by periodic tests for peracetic acid. Usually from about one to about ten hours is sufficient for the reaction to be completed at the preferred temperature. It is preferred, although not absolutely necessary, to separate the by-product acetic acid from the epoxide rapidly, since the acetic acid will react with the epoxide to form undesired products, decreasing the overall yield. Finally, the reaction mixture is subjected to conventional recovery procedures to isolate the epoxy acetal. Extraction with a suitable solvent, continuous distillation, or distillation under reduced pressures all are applicable to the recovery of the epoxidized compound.

Other peroxides such as perbenzoic acid, monoperphthalic acid, acetaldehyde monoperacetate, and hydroperoxides may be used as the epoxidizing agent, but for economic reasons, peracetic acid is more desirable for commercial application.

The following examples illustrate the practice of this invention:

EXAMPLE I.—2-(7'-TRICYCLO[3.2.1.0$^{2,4}$]-3'-OXAOCTYL)-1,3-DIOXEP-5-ENE

A. 2-(6'-bicyclo[2.2.1]-2'-heptenyl)-1,3-dioxep-5-ene

A weight of 122 grams (1 mole) of refined bicyclo[2.2.1]-5-heptene-2-carboxaldehyde (boiling point 72–73° C. at a pressure of 20 millimeters of mercury, refractive index, $n30/D=1.4830–1.4832$), was heated at reflux with 88 grams (1 mole) of cis-2-butene-1,4-diol, 500 milliliters of ethylene dichloride and 5 grams of p-toluenesulfonic acid until water no longer continued to be distilled from the reaction mixture (1½ hours). The p-toluenesulfonic acid was then neutralized with a slight excess of saturated aqueous sodium bicarbonate solution. Direct distillation of the remaining reaction mixture gave 106 grams (55.5 percent of the theoretical) of 2-(6'-bicyclo[2.2.1]-2'-heptenyl)-1,3-dioxep-5-ene at a boiling point of 82° C. at a pressure of 0.7 millimeters of mercury (refractive index, $n30/D=1.5047–1.5049$). Analysis for unsaturation by the sodium bromide-bromine method showed this intermediate to have a purity of 97.8 percent.

A second preparation, differing by the method of neutralization of the acid catalyst (addition of sodium methoxide), gave a 35 percent yield of the same product. There was evidence of rapid cleavage to the starting materials if excess base (or water) was employed.

B. 2-(7'-tricyclo[3.2.1.0$^{2,4}$]-3'-oxaoctyl)-1,3-dioxep-5-ene

A weight of 48 grams (0.25 mole) of 2-(6'-bicyclo[2.2.1]-2'-heptenyl)-1,3-dioxep-5-ene was allowed to react at 42–45° C. with 68.6 grams (0.25 mole) of a 27.7 percent solution of peracetic acid in ethyl acetate. After an elapsed time of three hours, analysis for remaining peracid showed that a conversion of 96 percent had been reached. Azeotropic removal of the co-product acetic acid with ethylbenzene, followed by direct fractionation gave 16 grams (30.8 percent of the theoretical amount) of 2-(7'-tricyclo[3.2.1.0$^{2,4}$]-3'-oxaoctyl)-1,3-dioxep-5-ene at a boiling point of 110° C., at a pressure of 0.7 millimeter of mercury (refractive index, $n30/D=1.5093$). The structure proposed in the name provided is consistent with the preferred epoxidation of the unsaturated bridge in the bicyclic portion of the molecule. The absence of strained-ring absorption bands (6.3 millimicrons) in the infrared spectrum of the product and the limited reactivity of the material to pyridine hydrochloride were also consistent with this structure. Purity by reaction with hydrogen bromide was 91 percent.

EXAMPLE II.—4-(7'-TRICYCLO[3.2.1.0$^{2,4}$]-3'-OXAOCTYL)-3,5,8-TRIOXABICYCLO[5.1.0]OCTANE

A weight of 41 grams (0.213 mole) of 2-(6'-bicyclo[2.2.1]-2'-heptenyl)-1,3-dioxep-5-ene (see I–A above) was allowed to react over a three-hour period with 137 grams (0.5 mole) of a 27.7 percent solution of peracetic acid in ethyl acetate. After this period, analyses showed that a peracid conversion of 97.6 percent had been reached. The removal of the low-boiling components of the reaction mixture was then effected with ethylbenzene at reflux under reduced pressure. Continued distillation at high vacuum gave a low yield of material distilling constantly at 155° C. at a pressure of 0.1 millimeter of mercury (refractive index, $n30/D=1.5182$). Analysis showed a diepoxide purity of 68 percent by the hydrogen bromide procedure. Infrared examination showed considerable epoxide ring opening, indicating that the second epoxide group can be introduced only at the sacrifice of the previously introduced bridged-ring epoxide. The limited effectiveness of the analytical procedures for such hindered epoxides would indicate that the figure of 68 percent, above, is conservative for the product obtained.

EXAMPLE III.—4-PROPYL-3,5,8-TRIOXABICYCLO [5.1.0]OCTANE

A. Synthesis of 2-propyl-1,3-dioxep-5-ene

A mixture of 176 grams (2.0 moles) of 2-butene-1,4-diol; 432 grams (6.0 moles) of n-butyraldehyde; 0.5 gram of p-toluene sulfonic acid and 250 milliliters of benzene was placed in a two-liter flask and placed under reflux on a still equipped with a 1″ x 12″ packed column. The water formed in the reaction was gradually removed at the still head as the benzene-water azeotrope over a two-hour period. Then the low boiling components of the reaction mixture were removed by rapid flash distillation after which the high boiling or product weight was taken at 50–90° C. at a pressure of 1.5 millimeters of mercury. Redistillation of the latter material in the presence of sodium hydroxide pellets gave 219 grams (77 percent of the theoretical yield) of 2-propyl-1,3-dioxep-5-ene at a boiling point of 58° C. at a pressure of 5.8 millimeters of mercury (refractive index, $n30/D=1.4463$; purity by quantitative bromination=98.8 percent).

B. Synthesis of 4-propyl-3,5,8-trioxabicyclo [5.1.0]octane

A weight of 106.5 grams (0.75 mole) of 2-propyl-1,3-dioxep-5-ene was placed in a one-liter reaction flask and allowed to react with 302.0 grams (1.0 mole) of a 25.2 percent solution of peracetic acid in ethyl acetate. After 3½ hours at 50° C., the slightly exothermic reaction was found to be essentially complete by analysis for remaining peracetic acid. The resulting mixture was fed gradually into a still system containing refluxing ethylbenzene to facilitate the removal of acetic acid, ethyl acetate and unspent, excess peracetic acid. There remained from this operation a crude product which was further refined by fractional distillation under reduced pressure on a ½″ x 12″ packed column. In all, 27 grams (29.5 percent of the theoretical yield) of 4-propyl-3,5,8-trioxabicyclo[5.1.0]octane were obtained at 76° C. at a pressure of 2 millimeters of mercury. The product was found to be a crystalline white solid with a melting point of 34–35° C. and a purity by the pyridine hydrochloride method of 93.0 percent.

EXAMPLE IV.—SPIRO[CYCLOHEXANE-1,4′-(3,′5,′8,′-TRIOXABICYCLO[5.1.0]OCTANE)]

A. Synthesis of 7,12-dioxaspiro(5,6)-9-dodecene

In the manner described in III–A, 1175 grams (12 moles) of cyclohexanone, 325 grams (4.0 moles) of 2-butene-1,4-diol, 0.5 gram of p-toluene sulfonic acid, and 600 grams of benzene were allowed to react over a four-hour period. After that period, sufficient benzene-water azeotrope had been recovered to indicate that the reaction was complete. Isolation of the product was conducted as in III–A above and 369 grams (55.0 percent of the theoretical amount) of 7.12-dioxaspiro(5,6)-9-dodecene were obtained at a boiling point of 54° C. and at a pressure of 0.2 millimeter of mercury and a refractive index, $n30/D=1.4837$–1.4841. Purity by quantitative bromination was found to be 100 percent.

B. Synthesis of spiro[cyclohexane-1,4′-(3,′5,′8′-trioxabicyclo-[5.1.0]octane)]

A weight of 168 grams (1.0 mole) of 7,12-dioxaspiro (5,6)-9-dodecene and 362 grams (1.2 moles) of a 25.2 percent solution of peracetic acid in ethyl acetate were allowed to react with stirring at 50° C. for a period of 5¾ hours at which time analyses indicated that an amount of peracid equivalent to the olefin charged had been consumed. The product from this reaction mixture was isolated in the same manner as that described in Example III–B and 157 grams (85.5 percent of the theoretical amount) of spiro[cyclohexane-1,4′-(3′,5′,8′-trioxabicyclo[5.1.0]octane)] were obtained by fractional distillation at a boiling point of 104° C. and at a pressure of 2.9 millimeters of mercury (refractive index, $$n30/D=1.4875$$

purity by epoxide analysis=98.8 percent; analysis for carbon and hydrogen: calculated for percent C=65.25; percent H=8.76; found for percent C=65.11; percent H=8.56).

EXAMPLE V.—SYNTHESIS OF 4-PHENYL-3,5,8-TRIOXABICYCLO-[5.1.0]OCTANE

A. Synthesis of 2-phenyl-1,3-dioxep-5-ene

In the manner described in Example III–A above, a mixture of 352 grams (4.0 moles) of 2-butene-1,4-diol, 848 grams (8.0 moles) of benzaldehyde, 0.5 gram of p-toluenesulfonic acid, and 500 grams of benzene were allowed to reflux at atmospheric pressure for a 4½ hour period after which no additional benzene-water azeotrope was formed as described in Example III–A. Reduced pressure distillation of the crude product gave 400 grams (56.9 percent of the theoretical amount) of 2-phenyl-1,3-dioxep-5-ene at a boiling point of 77° C. as measured at 0.3 millimeter of mercury (refractive index, $n30/D=1.5378$–1.5382; purity by quantitative bromination=96.4 percent).

B. Synthesis of 4-phenyl-3,5,8-trioxabicyclo[5.1.0]octane

In the same way described in Example III–B, a weight of 176 grams (1.0 mole) of 2-phenyl-1,3-dioxep-5-ene and 362 grams (1.2 moles) of a 25.2 percent solution of peracetate acid in ethyl acetate were mixed and allowed to react at 50° C. with stirring for a 7½ hour period. Conventional ethylbenzene azeotrope distillation was employed to facilitate removal of the by-product acetic acid and unspent peracetic acid. There remained a crude semi-solid mixture from which the product was isolated by crystallization from n-hexane. There were obtained 154 grams (80.2 percent of the theoretical amount) of white, crystalline 4-phenyl-3,5,8-trioxabicyclo[5.1.0]octane having a melting point of 84° C. (Purity by analysis for epoxide content= 98.0 percent.)

EXAMPLE VI.—SYNTHESIS OF 3,5,8-TRIOXABICYCLO[5.1.0]OCTANE

A. Preparation of 1,3-dioxep-5-ene

A mixture of 352 grams (4.0 moles) of 2-butene-1,4-diol, 120 grams (1.33 moles) of paraformaldehyde, 0.5 gram of p-toluenesulfonic acid and 500 grams of benzene was heated at reflux in a conventional still system for 5 hours after which time the removal of the benzene-water azeotrope ceased (see Example III–A). The remaining reaction mixture was further processed by rapid distillation to provide a crude high boiling fraction which was subsequently distilled at atmospheric pressure over solid sodium hydroxide. There were obtained 187 grams (50.6 percent of the theoretical amount) of 1,3-dioxep-5-ene at a boiling point of 127–128° C. (refractive index, $n30/D= 1.4522$–1.4528; purity by quantitative bromination=96.8 percent).

B. Preparation of 3,5,8-trioxabicyclo[5.1.0]octane

A weight of 100 grams (1.0 mole) of 1,3-dioxep-5-ene was placed in a one-liter flask and heated to 60° C. At that temperature, a weight of 329 grams (1.2 moles) of a 27.7 percent solution of peracetic acid in ethyl acetate was added over a one hour period. After an additional stirring period of 3½ hours, analyses for unreacted peracetic acid indicated that the reaction was complete. At this time, the reaction mixture was processed by the ethylbenzene azeotropic removal of acetic acid. Cooling of the acid-free mixture gave a crude solid product, which when recrystallized from n-heptane to provide 108 grams (93.2 percent of the theoretical amount) of white, crystalline 3,5,8-trioxabicyclo[5.1.0]octane (melting point=55° C.;

purity by analysis for epoxide content by the pyridine hydrochloride-pyridine method=98.3 percent).

EXAMPLE VII.—PREPARATION OF 4-(3,4-EPOXYBUTYL)-3,5,8-TRIOXABICYCLO[5.1.0]OCTANE

A. *Synthesis of 2-(3-butenyl)-1,3-dioxep-5-ene*

In a manner similar to that described in Example III–A, a mixture of 504 grams (6.0 moles) of 4-pentenal, 352 grams (4.0 moles) of 2-butene-1,4-diol, 0.5 gram of p-toluenesulfonic acid, and 600 grams of benzene was heated at reflux for 1½ hours after which time the formation of the benzene-water azeotrope ceased. Conventional distillation provided a high boiling fraction which was subsequently distilled under reduced pressure over solid sodium hydroxide to provide 395 grams (64.1 percent of the theoretical amount) of 2-(3-butenyl)-1,3-dioxep-5-ene at a boiling point of 69° C. at a pressure of 4.2 millimeters of mercury (refractive index, $n30/D=1.4641$; purity by quantitative bromination=98.0 percent).

B. *Preparation of 4-(3,4-epoxybutyl)-3,5,8-trioxabicyclo[5.1.0]octane*

A weight of 194 grams (1.25 moles) of 2-(3-butenyl)-1,3-dioxep-5-ene was placed in a reaction flask and heated to 55° C. Over a period of 2 hours and with constant agitation, a weight of 775 grams (2.75 moles) of a 27.7 percent solution of peracetic acid in ethyl acetate was added. After an additional three hours under these conditions, analyses for unreacted peracetic acid indicated all of the olefin had been consumed. The by-product acetic acid, ethyl acetate and unspent peracetic acid were effectively recovered by a rapid stripping distillation with ethylbenzene at a pressure of 50 millimeters for mercury. Subsequent fractionation gave 81 grams (34.8 percent of the theoretical amount) of 4-(3,4-epoxybutyl)-3,5,8-trioxabicyclo[5.1.0]octane at a boiling point of 126–127° C. at a pressure of 1.5 millimeters of mercury (refractive index, $n30/D=1.4770$; purity by analysis for epoxy groups by the pyridine hydrochloride in pyridine method=93.6 percent).

EXAMPLE VIII.—PREPARATION of 4-(3-BUTENYL)-3,5,8-TRIOXABICYCLO[5.1.0]OCTANE

A weight of 195 grams (1.265 moles) of 2-(3-butenyl)-1,3-dioxep-5-ene (see Example VII–A) was placed in a reaction flask and heated to 60° C. At this temperature and with stirring, a weight of 347 grams (1.265 moles) of a 27.7 percent solution of peracetic acid in ethyl acetate was added over a one hour period. After an additional 1½ hours of stirring at 60° C., analyses for unreacted peracetic acid showed that the reaction was essentially complete. The reaction mixture was then rapidly distilled on a high vacuum still. There were obtained 80 grams (37.2 percent of the theoretical amount) of 4-(3-butenyl)-3,5,8-trioxabicyclo[5.1.0]octane at a boiling point of 74–76° C. at a pressure of 0.5 millimeter of mercury (refractive index, $n30/D=1.4719$; purity by analysis for expoxide content=94 percent). The infrared absorption spectrum for this compound showed the presence of terminal vinyl unsaturation and other features consistent with the structure proposed.

EXAMPLE IX.—PREPARATION OF 4-VINYL-3,5,8-TRIOXABICYCLO[5.1.0]OCTANE

A. *2-Vinyl-1,3-dioxep-5-ene*

A mixture of 500 milliliters of ethylene dichloride, 168 grams (3 moles) of acrolein and 1.5 grams of sulfuric acid was placed in a glass reaction flask and heated to 50° C. Then, with stirring and over a 40 minute period, 212 grams (2.4 moles) of 2-butene-1,4-diol were added to the reaction mixture. Then, the mixture was stirred at 50° C. for an additional three hours. After cooling, the water layer was decanted and the sulfuric acid catalyst was neutralized with sodium acetate. Distillation at reduced pressure gave 124 grams (41.0 percent of the theoretical yield) of 2-vinyl-1,3-dioxep-5-ene at a boiling point of 54–55° C. (refractive index, $n30/D=1.4642$).

B. *4-vinyl-3,5,8-trioxabicyclo[5.1.0]octane*

A weight of 68 grams (0.54 mole) of 2-vinyl-1,3-dioxepene was placed on a one-liter reaction flask and heated to 60° C. Then, with stirring, a weight of 156 grams (0.60 mole) of a 29.4 percent solution of peracetic acid in ethyl acetate was added to the reaction vessel over a 30 minute period. After an additional 3 hours at this temperature, analyses showed that 90 percent of the available peracid had been consumed. The acetic acid produced as a by-product, along with ethyl acetate and unspent peracid, was then removed by azeotropic distillation at 50 millimeters of mercury pressure with ethylbenzene. Subsequent fractionation gave 61 grams (88.4 percent of the theoretical amount) of 4-vinyl-2,5,8-trioxabicyclo[5.1.0]octane at a boiling point of 82° C. at 3.8 millimeters of pressure (refractive index, $$n30/D=1.4758-1.4755$$

purity by analyses for epoxide groups by the pyridine hydrochloride-chloroform procedure=99.5 percent). Infrared absorption studies showed that expoxidation provided only the product described and not the isomeric epoxyethyl dioxepene.

EXAMPLE X.—PREPARATION OF 4-EPOXYETHYL-3,5,8-TRIOXABICYCLO[5.1.0]OCTANE

A weight of 68 grams (0.54 mole) of 2-vinyl-1,3-dioxep-5-ene (see IX–A) was placed in a one-liter reaction flask and heated to 70° C. At this temperature and with constant stirring, a weight of 310 grams (1.2 moles) of a 29.4 percent solution of peracetic acid in ethyl acetate was added over a 1¼ hour period. At this point the reaction mixture was stirred at 72–78° C. for an additional five hour period after which time two analyses showed that 95 percent of the theoretical peracid had been consumed. Azeotropic removal of the by-product acetic acid, along with the ethyl acetate and unreacted peracetic acid, was effected by gradual addition of the reaction mixture to a still containing refluxing ethylbenzene at a pressure of 50 millimeters of mercury. Subsequent fractional distillation of the remaining material gave 19 grams (22 percent of the theoretical amount) of 4-epoxyethyl-3,5,8-trioxabicyclo[5.1.0]octane at a boiling point of 110° C. at a pressure of 1.5 millimeters of mercury (refractive index, $n30/D=1.4792-1.4793$; purity by analyses for epoxide groups by the pyridine hydrochloride-pyridine method=89.8 percent).

EXAMPLE XI.—PREPARATION OF 4-[4'-(3'-METHYL-7' - OXABICYCLO[4.1.0]HEPTYL)]-3,5,8-TRIOXABICYCLO[5.1.0]OCTANE

A. *2-(6-methyl-3-cyclohexenyl)-1,3-dioxep-5-ene*

A mixture of 496 grams (4 moles) of 6-methyl-3-cyclohexenecarboxaldehyde, 352 grams (4 moles) of 2-butene-1,4-diol, 300 milliliters of benzene and 2 grams of p-toluenesulfonic acid was placed in a still kettle and brought to reflux at atmospheric pressure. After 3½ hours, no more water was removed at the still head, indicating that the reaction had gone to completion. The catalyst was neutralized by the addition of 1.7 grams of sodium acetate, after which the mixture was rapidly distilled on a short column. Redistillation of the high-boiling material gave 569 grams (73.3 percent of the theoretical amount) of 2-(6-methyl-3-cyclohexenyl)-1,3-dioxep-5-ene at a boiling point of 74° C., at a pressure of 1.0 millimeters of mercury (refractive index, $n30/D=1.4958$; purity by quantitative bromination=98.7 percent).

B. 4-[4'-(3'-methyl-7'-oxabicyclo[4.1.0]heptyl)]-3,5,8-trioxabicyclo[5.1.0]octane A weight of 475 grams (2.45 moles) of 2-(6-methyl-3-cyclohexenyl)-1,3-dioxep-5-ene was placed in a reaction vessel and treated under agitation over a 6 hour period with 2066 grams (7.35 moles) of a 27.0 percent solution of peracetic acid in ethyl acetate. After an additional 1½ hours, analyses showed the epoxidation was complete. The reaction mixture was passed twice through a steam heated stripping coil under reduced pressure, first at 50 millimeters of mercury and secondly at from 3 to 5 millimeters. There was obtained 585 grams of a viscous product which, when analyzed for epoxy groups, was ascertained to contain 52 percent of the desired diepoxide, 4 - [4' - (3'-methyl-7'-oxabicyclo[4.1.0]heptyl)]-3,5,8-trioxabicyclo[5.1.0]octane.

EXAMPLE XII.—PREPARATION OF 4-[4'-(3',5',8'-TRIOXABICYCLO[5.1.0]OCTYL)]-3,5,8 - TRIOXABICYCLO[5.1.0]OCTANE

A. Preparation of 2,2'-di-(1,3-dioxep-5-ene)

A mixture of 484 grams (5.5 moles) of 2-butene-1,4-diol, 532 grams (2.75 moles) of a 30 percent aqueous solution of glyoxal, 310 milliliters of benzene and 2 grams of p-toluenesulfonic acid was placed on a still and allowed to reflux at atmospheric pressure. After 10 hours, no further water could be removed as the benzene-water azeotrope. Then the mixture was cooled, which caused a quantity of solid material to separate by crystallization. The solids were recrystallized from n-hexane to provide 109 grams (20 percent of the theoretical yield) of 2,2'-di-(1,3-dioxep-5-ene) as white crystals with a melting point of 96-98° C. (purity by quantitative bromination=97.8 percent).

B. 4-[4'-(3',5',8'-trioxabicyclo[5.1.0]octyl)]-3,5,8-trioxabicyclo[5.1.0]octane A weight of 72 grams (0.364 mole) of 2,2'-di-(1,3-dioxep-5-ene) was dissolved in 250 grams of ethyl acetate and heated in a reaction flask to 50° C. At this temperature and with stirring, a weight of 329 grams (1.2 moles) of a 27.7 percent solution of peracetic acid in ethyl acetate was added over a 2 hour period. A total reaction time of 12 hours at this temperature was required to achieve a conversion of 94 percent of the theoretical peracid. At this point, the reaction mixture was cooled, permitting 74 grams of 4-[4'-(3',5',8'-trioxabicyclo[5.1.0]octyl)]-3,5,8-trioxabicyclo[5.1.0]octane to separate as white crystalline solid. This represents a yield of 88.5 percent of the theoretical. The product melted sharply at 189-190° C. (purity by analysis for epoxide groups=89 percent).

Although the invention has been illustrated by the preceding examples, the invention is not to be construed as limited to the materials employed in the above examples, but rather, the invention encompasses the generic invention as hereinbefore disclosed. Various modifications and embodiments of this invention can be made without departing from the spirit and scope thereof.

What is claimed is:
1. 3,5,8-trioxabicyclo[5.1.0]octane.
2. 4-propyl-3,5,8-trioxabicyclo[5.1.0]octane.
3. 4-vinyl-3,5,8-trioxabicyclo[5.1.0]octane.
4. 4-(1,2-epoxyethyl)-3,5,8-trioxabicyclo[5.1.0]octane.
5. 4-(3-butenyl)-3,5,8-trioxabicyclo[5.1.0]octane.
6. 4-(3,4-epoxybutyl)-3,5,8-trioxabicyclo[5.1.0]octane.
7. Spiro[cyclohexane-1,4'-(3',5',8'-trioxabicyclo[5.1.0]octane)].
8. 4-[4'-(3',5',8'-trioxabicyclo[5.1.0]octyl)]-3,5,8 - trioxabicyclo[5.1.0]octane.
9. 4-(7'-tricyclo[3.2.1.0²,⁴]-3'-oxaoctyl)-3,5,8-trioxabicyclo[5.1.0]octane.
10. Epoxy acetals of the formula:

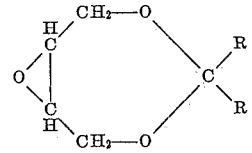

wherein R is a member selected from the group consisting of hydrogen and alkyl, alkenyl, carbocylic aryl, cycloalkyl, alkylcycloalkyl, cycloakenyl, cycloalkenylalkyl, alkylcycloalkenyl, bicycloalkyl, bicycloalkenyl, bicycloalkylalkyl, bicycloakenyalkyl, epoxyalkyl, epoxycycloalkyl, alkylepoxycycloalkyl and epoxybicycloalkyl, of not more than 22 carbon atoms and wherein two of said R's together form a homocarbocyclic ring system.

11. 4 - alkyl - 3,5,8 - trioxabicyclo[5.1.0]octane wherein said alkyl is of not more than 22 carbon atoms.

12. 4 - alkenyl - 3,5,8-trioxabicyclo[5.1.0]octane wherein said alkenyl is of not more than 22 carbon atoms.

13. 4 - cycloalkenyl - 3,5,8 - trioxabicyclo[5.1.0] octane wherein said cycloalkenyl is of not more than 22 carbon atoms.

14. 4 - bicycloalkenyl - 3,5,8 - trioxabicyclo [5.1.0] octane wherein said bicycloalkenyl is of not more than 22 carbon atoms.

15. 4 - epoxyalkyl - 3,5,8 - trioxabicyclo[5.1.0]octane wherein said epoxyalkyl is of not more than 22 carbon atoms.

16. 4 - epoxycycloalkyl - 3,5,8 - trioxabicyclo [5.1.0] octane wherein said epoxycycloalkyl is of not more than 22 carbon atoms.

17. 4 - epoxybicycloalkyl - 3,5,8 - trioxabicyclo[5.1.0] octane wherein said epoxybicycloalkyl is of not more than 22 carbon atoms.

18. A compound of the formula:

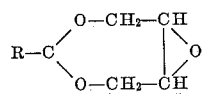

wherein R is selected from the group consisting of propyl, phenyl and 1,2-epoxypropyl.

19. A compound of the formula:

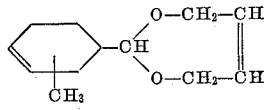

References Cited

UNITED STATES PATENTS

| | | | |
|---|---|---|---|
| 2,730,531 | 1/1956 | Payne et al. | 260—338 |
| 2,895,962 | 7/1959 | Fischer | 260—340.7 |

OTHER REFERENCES

Brannock et al.: "J. Org. Chem.," vol. 21, pp. 1366–1368 (1956).

"J. Am. Chem. Soc.," vol. 80, page 6303 (1958)

"J. Chem. Soc.," page 221 (1959).

"J. Org. Chem.," vol. 24, page 934 (1959).

Pattison: "J. Org. Chem.," vol. 22, page 662 (1957).

ALEX MAZEL, Primary Examiner.

IRVING MARCUS, Examiner.

JOSE TOVAR, Assistant Examiner.